United States Patent
McIver et al.

(10) Patent No.: US 11,132,915 B1
(45) Date of Patent: Sep. 28, 2021

(54) AUGMENTED REALITY SYSTEM FOR FIELD TRAINING

(71) Applicant: The United States of America, as represented by the Secretary of the Navy, Arlington, VA (US)

(72) Inventors: Stephen McIver, Oxnard, CA (US); Nicholas Lombardo, Long Beach, CA (US); Priya Malavia, Westlake Village, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 400 days.

(21) Appl. No.: 16/254,673

(22) Filed: Jan. 23, 2019

(51) Int. Cl.
*G09B 9/00* (2006.01)
*F41G 3/26* (2006.01)
*G02B 27/01* (2006.01)
*G06F 3/01* (2006.01)

(52) U.S. Cl.
CPC ............... *G09B 9/003* (2013.01); *F41G 3/26* (2013.01); *G02B 27/0172* (2013.01); *G06F 3/016* (2013.01); *G02B 2027/0141* (2013.01)

(58) Field of Classification Search
CPC ................................. G06F 3/14; G09B 9/003
USPC ................ 434/19; 348/158; 359/567; 42/90
See application file for complete search history.

(56) References Cited

U.S. PATENT DOCUMENTS

| | | |
|---|---|---|
| 10,030,931 B1 | 7/2018 | Black et al. |
| 10,114,127 B2 | 10/2018 | Brown et al. |
| 2012/0235885 A1* | 9/2012 | Miller ................. G06F 3/011 345/8 |
| 2012/0249797 A1* | 10/2012 | Haddick ............... G06F 3/016 348/158 |
| 2015/0309316 A1* | 10/2015 | Osterhout ............. G06F 1/163 345/8 |
| 2016/0033221 A1* | 2/2016 | Schmehl ............. F41G 11/003 42/90 |
| 2016/0187654 A1* | 6/2016 | Border ................... G02B 5/18 359/567 |
| 2019/0077504 A1* | 3/2019 | Chapman ............ G02B 27/017 |
| 2019/0212106 A1* | 7/2019 | Bortz .................. A63F 13/219 |

* cited by examiner

*Primary Examiner* — Ruay Ho
(74) *Attorney, Agent, or Firm* — Naval Air Warfare Center Weapons Division; Jimmy M. Sauz

(57) ABSTRACT

An augmented reality (AR) system for field training. The AR system may comprise: user platform sensors for obtaining user platform data associated with geolocation/orientation/movement of a user platform; a weapon simulator configured for haptic feedback and comprising weapon sensors for obtaining weapon data associated with muzzle orientation and trigger actuation of the weapon simulator, a head-worn display device for depicting AR graphic elements associated with training simulation data; target platform sensors for obtaining target platform data associated with geolocation/orientation/movement of a target platform; a microcontroller for packetizing the target platform data for wireless transmission; a computer system for generating the training simulation data based on the user platform data, weapon data, and target platform data; and transceivers for providing wireless communication between the computer system and microcontroller. The AR graphic elements may provide visual indications of the training simulation data, including severity and location of a projectile impact.

20 Claims, 8 Drawing Sheets

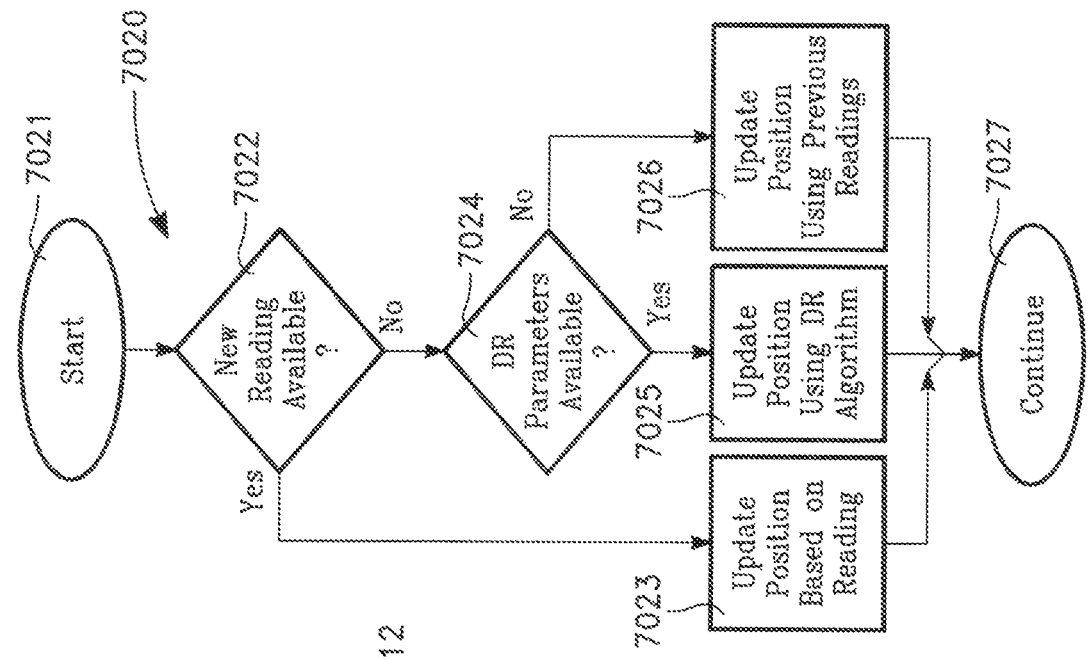
FIG. 7C
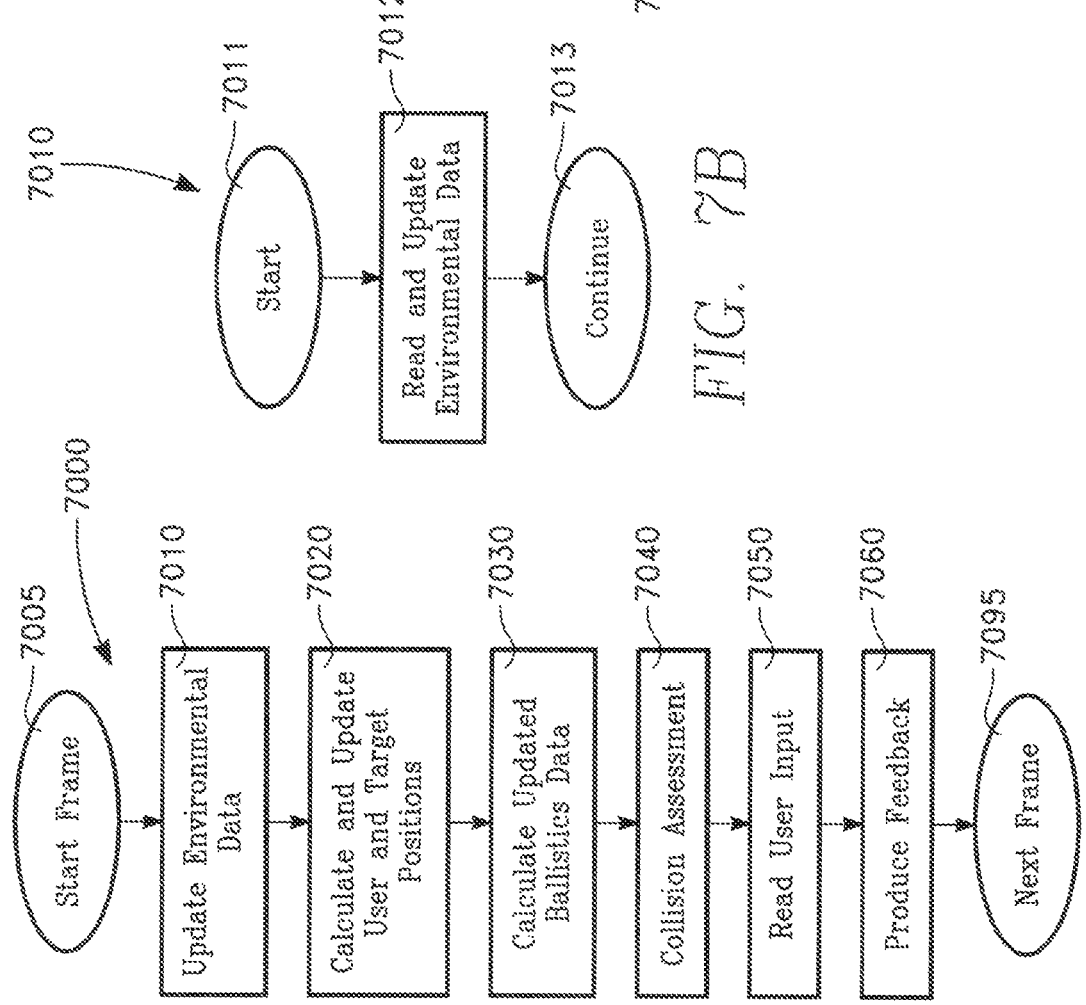
FIG. 7B
FIG. 7A

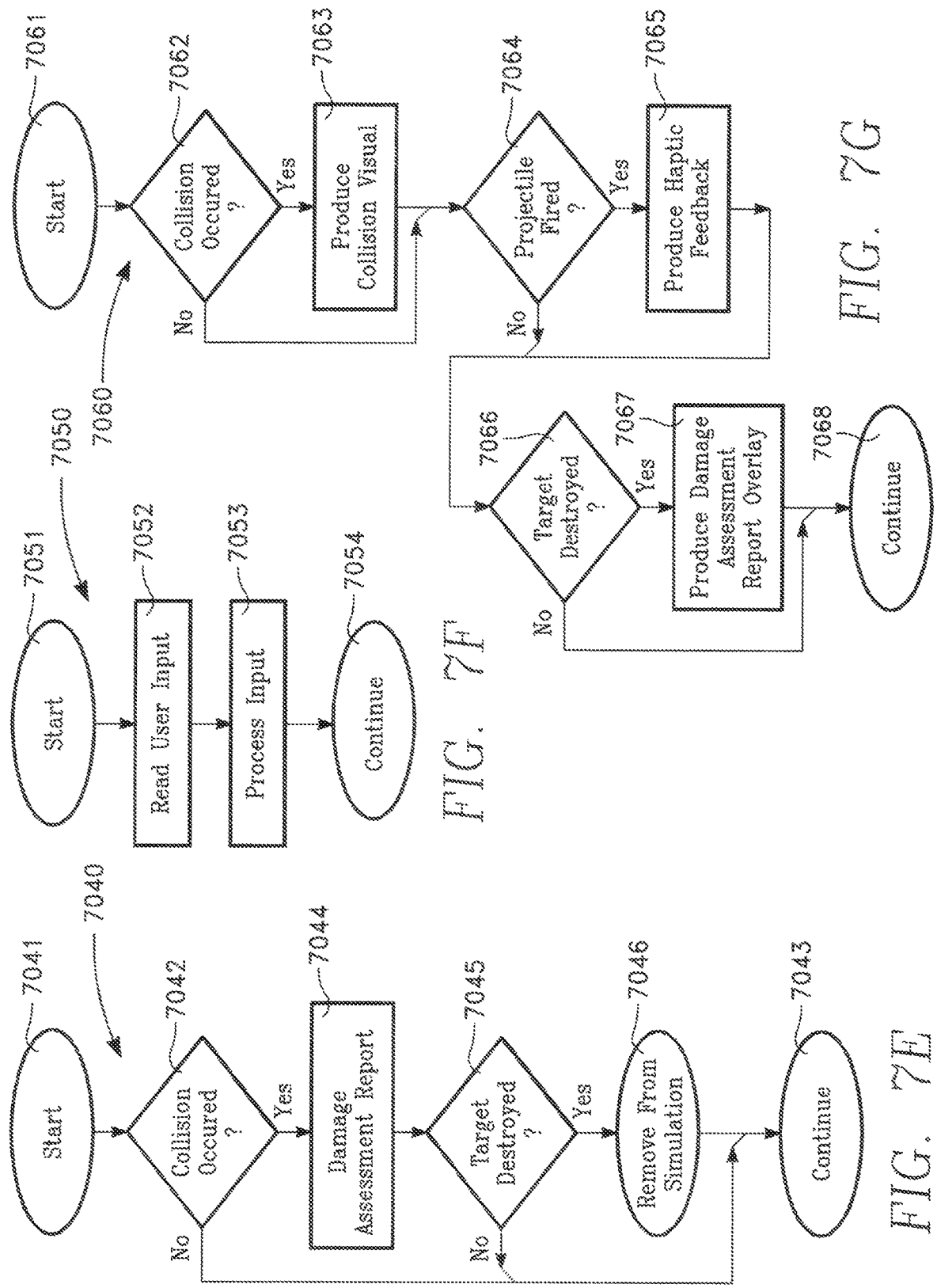

AUGMENTED REALITY SYSTEM FOR FIELD TRAINING

STATEMENT REGARDING FEDERALLY SPONSORED RESEARCH OR DEVELOPMENT

The invention disclosed herein may be manufactured and used by or for the government of the United States of America for governmental purposes without the payment of any royalties thereon or therefor.

FIELD OF USE

The present disclosure relates generally to augmented reality (AR) systems for field training exercises.

BACKGROUND

When participating in live fire exercises, trainees are generally situated in a simulated, combative environment and equipped with a loaded firearm to destroy physical targets within a vicinity. These training activities, however, tend to be expensive due to the costs attributed to the administration of the training exercise and replacement of ammunition and physical targets. These training activities can also be dangerous, as projectiles may unintentionally strike a bystander.

As a result, virtual reality (VR) training has been proposed to address these cost and safety concerns. VR training generally involves inserting trainees into a virtual environment and providing those trainees with a virtual firearm in order to shoot virtual targets. Unfortunately, VR training may negatively affect the user's training experience, as VR-based weapons and targets generally do not account for other factors such as environmental conditions (e.g., wind velocity) and how those conditions might affect projectile ballistics (e.g., air drag affecting bullet dimensions and weight). As such, individuals undergoing VR training might grow unaccustomed to a particular weapon or skillset.

Therefore, a need exists that overcomes these deficiencies. The present disclosure introduces a new and improved system that allows individuals to train in a real-world environment without incurring the high costs attributed to live fire exercises while minimizing safety concerns.

SUMMARY OF ILLUSTRATIVE EMBODIMENTS

To minimize the limitations in the related art and other limitations that will become apparent upon reading and understanding the present specification, the following discloses a new and useful augmented reality (AR) system for field training.

One embodiment may an augmented reality (AR) system for field training, comprising: a plurality of user platform sensors coupled to a user platform and configured to provide user platform data; a weapon simulator movably mounted on the user platform via a weapon mount and configured to provide haptic feedback, the weapon simulator comprising a plurality of weapon sensors for providing weapon data; a head-worn display device for depicting AR graphic elements associated with training simulation data by projecting the AR graphic elements on a transparent medium disposed within a field of view (FOV) of a user, such that the AR graphic elements may be superimposed with an environment viewable by the user; a plurality of target platform sensors coupled to a target platform and configured to provide target platform data; and a computer system, comprising a storage medium having a plurality of machine readable instructions and a processor configured to generate the training simulation data based on the user platform data, the weapon data, and the target platform data by executing the plurality of machine readable instructions, wherein the training simulation data may be transmitted to the head-worn display device. The plurality of target platform sensors may comprise: a first global positioning system (GPS) receiver, a first magnetometer, and a first inertial measurement unit (IMU); and wherein the target platform data may comprise: a first geolocation data obtained from the first GPS receiver, a first bearing data obtained from the first magnetometer; and a first inertial data obtained from the first IMU. The processor may be configured to generate, based on the target platform data, a first interpolation data for tracking the target platform. The plurality of user platform sensors may comprise: a second GPS receiver, a second magnetometer, and a second IMU; and wherein the user platform data may comprise: a second geolocation data obtained from the second GPS receiver, a second bearing data obtained from the second magnetometer, and a second inertial data obtained from the second IMU. The processor may be configured to generate, based on the user platform data, a second interpolation data for tracking the user platform. The plurality of weapon sensors may comprise: a trigger sensor and one or more encoders; and wherein the weapon data may comprise: a muzzle orientation data obtained from the one or more encoders; and a trigger data associated with actuation of the trigger sensor. The AR system may further comprise a microcontroller in electrical communication with the target platform sensors and configured to packetize the target platform data for wireless transmission. When generating the training simulation data, the processor may determine a projectile ballistics, including a severity and location of a projectile impact; and wherein at least one of the AR graphic elements projected on the head-worn display device may provide a visual indication in the FOV of the severity and location of the projectile impact.

Another embodiment may be an AR system for field training, comprising: a plurality of user platform sensors coupled to a user platform and configured to provide user platform data for tracking movement of the user platform; a weapon simulator movably mounted on the user platform via a weapon mount and configured to provide haptic feedback, the weapon simulator comprising a plurality of weapon sensors for providing weapon data associated with muzzle orientation and trigger actuation of the weapon simulator; a head-worn display device for depicting AR graphic elements associated with training simulation data by projecting the AR graphic elements on a transparent medium disposed within a FOV of a user, such that the AR graphic elements may be superimposed with an environment viewable by the user; a plurality of target platform sensors coupled to a target platform and configured to provide target platform data for tracking movement of the target platform; a microcontroller in electrical communication with the target platform sensors and configured to packetize the target platform data for wireless transmission; and a computer system, comprising a storage medium having a plurality of machine readable instructions and a processor configured to generate the training simulation data based on the user platform data, the weapon data, and the target platform data by executing the plurality of machine readable instructions, wherein the training simulation data may be transmitted to the head-worn display device and may include projectile ballistics; wherein at least one of the AR graphic elements of the head-worn display device may provide a visual indication in the FOV of a severity and location of a projectile impact. The plurality of target platform sensors may comprise: a first GPS receiver, a first magnetometer, and a first IMU; and wherein the target platform data may comprise: a first geolocation data obtained from the first GPS receiver, a first bearing data obtained from the first magnetometer, a first inertial data obtained from the first IMU; and a first interpolation data generated by the processor, based on the first geolocation data, the first bearing data, and the first inertial data. The plurality of user platform sensors may comprise: a second GPS receiver, a second magnetometer, and a second IMU; and wherein the user platform data may comprise: a second geolocation data obtained from the second GPS receiver; a second bearing data obtained from the second magnetometer; a second inertial data obtained from the second IMU; and a second interpolation data generated by the processor, based on the second geolocation data, the second bearing data, and the second inertial data. The plurality of weapon sensors may comprise: a trigger sensor for obtaining trigger data based on actuation of a trigger of the weapon simulator; and one or more encoders for obtaining muzzle orientation data by measuring an output angle based on an orientation of the weapon simulator on the weapon mount. The microcontroller may be in wireless communication with the computer system; and wherein the AR system may further comprise: first and second transceivers for the wireless transmission, the first transceiver being in electrical communication with the microcontroller and the second transceiver being in electrical communication with the computer system. The plurality of machine readable instructions may comprise: a first plurality of instructions configured to control the processor to determine a first data associated with a geolocation and a three dimensional orientation of the target platform based on the target platform data, a second data associated with a geolocation and a three dimensional orientation of the user platform based on the user platform data, and a third data associated with a muzzle orientation of the weapon simulator based on the weapon data; a second plurality of instructions configured to control the processor to determine ballistics data based on at least: the first, second, and third data, and a path of travel of the projectile from the weapon simulator to the projectile impact; a third plurality of instructions configured to control the processor to determine a collision assessment data based on the severity and location of the projectile impact; and a fourth plurality of instructions configured to control the processor to generate the training simulation data, based on at least: the first, second, and third data, the ballistics data, and the collision assessment data.

Another embodiment may be an AR system for field training, comprising: a plurality of user platform sensors coupled to a user platform and configured to provide user platform data for determining geolocation, orientation, and movement of the user platform; a weapon simulator movably mounted on the user platform via a weapon mount and configured to provide haptic feedback, the weapon simulator comprising a plurality of weapon sensors for providing weapon data associated with muzzle orientation and trigger actuation of the weapon simulator; a head-worn display device for depicting AR graphic elements associated with training simulation data by projecting the AR graphic elements on a transparent medium disposed within a FOV of a user, such that the AR graphic elements may be superimposed with an environment viewable by the user, a plurality of target platform sensors coupled to a target platform and configured to provide target platform data for determining geolocation, orientation, and movement of the target platform; a microcontroller in electrical communication with the target platform sensors and configured to packetize the target platform data for wireless transmission; a computer system, comprising a storage medium having a plurality of machine readable instructions and a processor configured to generate the training simulation data based on the user platform data, the weapon data, and the target platform data by executing the plurality of machine readable instructions, wherein the training simulation data may be transmitted to the head-worn display device and may include projectile ballistics; and first and second transceivers for the wireless transmission, the first transceiver being in electrical communication with the microcontroller and the second transceiver being in electrical communication with the computer system; wherein at least one of the AR graphic elements of the head-worn display device may provide a visual indication in the FOV of a severity and location of a projectile impact. The plurality of target platform sensors may comprise: a first GPS receiver, a first magnetometer, and a first IMU; and wherein the target platform data may comprise: a first geolocation data obtained from the first GPS receiver; a first bearing data obtained from the first magnetometer; a first inertial data obtained from the first IMU; and a first interpolation data generated by the processor, based on the first geolocation data, the first bearing data, and the first inertial data. The plurality of user platform sensors may comprise: a second GPS receiver, a second magnetometer, and a second IMU; and wherein the user platform data may comprise: a second geolocation data obtained from the second GPS receiver; a second bearing data obtained from the second magnetometer; a second inertial data obtained from the second IMU; and a second interpolation data generated by the processor, based on the second geolocation data, the second bearing data, and the second inertial data. The AR system may further comprise an anemometer for providing environmental data associated with wind velocity and wind direction. The plurality of weapon sensors may comprise: a trigger sensor for obtaining trigger data based on actuation of a trigger of the weapon simulator, and one or more encoders operably coupled to the weapon mount for obtaining muzzle orientation data by measuring an output angle based on an orientation of the weapon simulator on the weapon mount. The plurality of machine readable instructions may comprise: a first plurality of instructions configured to control the processor to determine a first data associated with a geolocation and a three dimensional orientation of the target platform based on the target platform data, a second data associated with a geolocation and a three dimensional orientation of the user platform based on the user platform data, a third data associated with a muzzle orientation of the weapon simulator based on the weapon data, and a fourth data associated with wind velocity and wind direction based on the environmental data; a second plurality of instructions configured to control the processor to determine ballistics data based on at least: the first, second, third, and fourth data, and a path of travel of the projectile from the weapon simulator to the projectile impact; a third plurality of instructions configured to control the processor to determine a collision assessment data based on the severity and location of the projectile impact; and a fourth plurality of instructions configured to control the processor to generate the training simulation data, based on at least: the, first, second, third and fourth data, the ballistics data, and the collision assessment data.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are illustrative embodiments. They do not illustrate all embodiments. They do not set forth all embodiments. Other embodiments may be used in addition or instead. Details, which may be apparent or unnecessary, may be omitted to save space or for more effective illustration. Some embodiments may be practiced with additional components or steps and/or without all of the components or steps, which are illustrated. When the same numeral appears in different drawings, it is intended to refer to the same or like components or steps.

FIGS. 7A to 7G are illustrations of embodiments of a process and routines for generating training simulation data by the computer system.

DETAILED DESCRIPTION OF ILLUSTRATIVE EMBODIMENTS

Figure 1:
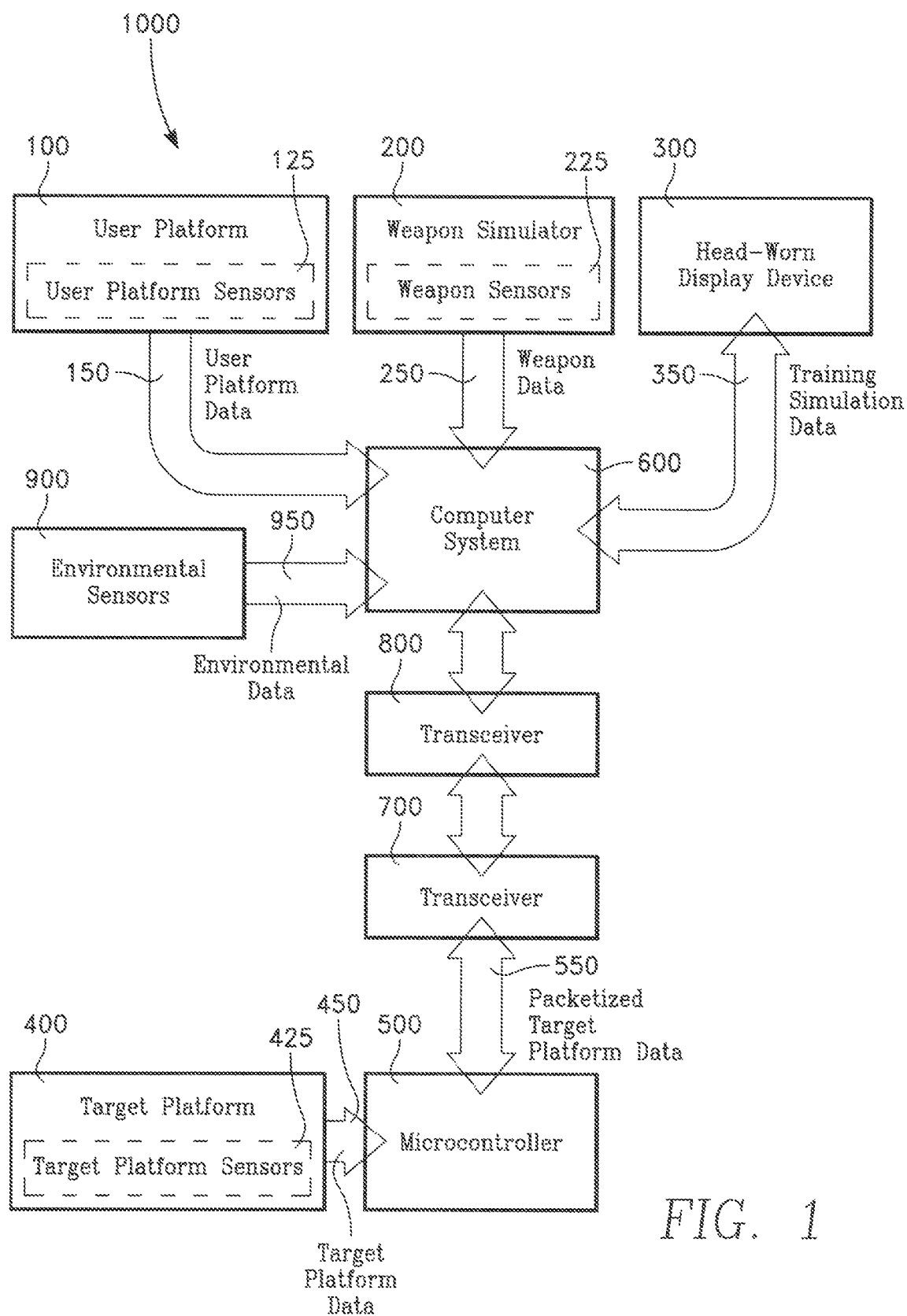
FIG. 1 is a flow diagram of one embodiment of an augmented reality (AR) system for field training.

In the following detailed description, numerous specific details are set forth in order to provide a thorough understanding of various aspects of one or more embodiments of the augmented reality (AR) system for field training. However, these embodiments may be practiced without some or all of these specific details. In other instances, well-known methods, procedures, and/or components have not been described in detail so as not to unnecessarily obscure aspects of these embodiments.

While multiple embodiments of the AR system are disclosed, still other embodiments will become apparent to those skilled in the art from the following detailed description. As will be realized, the following embodiments of the AR system may be capable of modifications in various obvious aspects, all without departing from the spirit and scope of protection. Accordingly, the graphs, figures, and the detailed descriptions thereof, are to be regarded as illustrative in nature and not restrictive. Also, the reference or non-reference to a particular embodiment shall not be interpreted to limit the scope of the disclosure.

Before the embodiments are disclosed and described, it is to be understood that these embodiments are not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

The subject matter described herein may be embodied as a system, a method/process, and/or a computer program product. The computer program product may include a computer readable storage medium (or media) having machine readable instructions thereon for causing a processor to carry out aspects of the subject matter described herein.

Aspects of the present disclosure may also be implemented as entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium, computer readable storage medium, or a storage medium. A storage medium may be, for example, but is not limited to, an electronic, magnetic, optical, electromagnetic, or semiconductor system, apparatus, or device, or any suitable combination of the foregoing. Specific examples of the storage medium may include, without limitation: a portable computer diskette, a hard disk, a random access memory (RAM), a mad-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. As used herein, a storage medium may be any tangible medium that can contain, or store a program for use by or in connection with an instruction execution system, apparatus, or device.

A computer readable storage medium may include a propagated data signal with machine readable instructions embodied therein, for example, in baseband or as part of a carrier wave. Such a propagated signal may take any of a variety of forms, including, but is not limited to, electromagnetic, optical, or any suitable combination thereof. A computer readable storage medium may be any computer readable medium that can communicate, propagate, or transport a program for use by or in connection with an instruction execution system, apparatus, or device. Program code or machine readable instructions embodied on a computer readable storage medium may be transmitted using any appropriate medium, including but not limited to wireless, wireline, optical fiber cable, RF, etc., or any suitable combination of the foregoing.

Computer program code or machine readable instructions for carrying out operations for aspects of the present disclosure may be written in any combination of one or more programming languages, including an object oriented programming language such as Java, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The machine readable instructions may execute entirely on a computer system, partly on the computer system, as a stand-alone software package, partly on the computer system and partly on a remote computer or entirely on the remote computer or server. In the latter scenario, the remote computer may be connected to the computer system through any type of network, including a local area network (LAN) or a wide area network (WAN), or the connection may be made to an external computer (for example, through the Internet using an Internet Service Provider) or in a cloud computing environment, or offered as a service such as a Software as a Service (SaaS).

It should also be understood that some of the functional units described in this specification might be labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code or machine readable instructions may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be machine readable instructions and may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment", "an embodiment", or "another embodiment" may mean that a particular feature, structure, or characteristic described in connection with the embodiment may be included in at least one embodiment of the present disclosure. Thus, appearances of the phrases "in one embodiment" or "in an embodiment" in various places throughout this specification may not necessarily refer to the same embodiment.

Furthermore, the described features, structures, or characteristics may be combined in any suitable manner in one or more embodiments. In the following description, numerous specific details are provided, such as examples of sensors, signals, tracking measurements, etc . . . , to provide a thorough understanding of the embodiments. One skilled in the relevant art will recognize, however, that the scope of protection can be practiced without one or more of the specific details, or with other methods, components, materials, etc . . . . In other instances, well-known structures, materials, or operations are generally not shown or described in detail to avoid obscuring aspects of the disclosure.

Definitions

In the following description, certain terminology is used to describe certain features of one or more embodiments. For example, as used herein, the terms "application," "software," or "software application" generally refer to any set of machine-readable instructions on a client machine, web interface, and/or computer system, that directs a computer's processor to perform specific steps, processes, or operations disclosed herein.

As used herein, the terms "augmented reality" or "AR" refer to any application or user interface platform which provides a live, direct, or indirect, view of a physical, real-world environment whose elements are augmented by computer-generated sensory input such as sound, video, graphics or global positioning system (GPS) data.

As used herein, the term "sensor" generally refers to any device, system, or component that detects, measures, tracks, and/or records a physical property or physical change such as location, movement, and orientation. Sensors, according to the present disclosure, may include, without limitation, a GPS receiver, magnetometer, inertial measurement unit (IMU), trigger sensor, encoders, and the like. Sensors, according to the present disclosure, may also be implemented on a user platform (i.e., user platform sensors), target platform (i.e., target platform sensors), and weapon simulator (i.e., weapon sensors). Other sensors may also be implemented such as an anemometer in order to monitor environmental conditions such as air density, wind direction, and wind velocity.

As used herein, the term "field of view" or "FOV" refer to the field of vision or extent of observable environment that can be seen by a person, trainee, or user.

As used herein, the term "weapon mount" generally refers to a weapon component used to moveably affix a weapon simulator onto vehicle (e.g., user platform, vessel) for stabilization. Weapon mounts may include, without limitation, turrets, coaxial weapon mounts, fixed weapon mounts, pintles, and swing mounts (e.g., swing arms) and may utilize encoders to determine muzzle orientation of the weapon simulator.

As used herein, the term "target" generally refers to any object selected as the aim of an attack within the simulated environment created by the AR system and may include simulated targets, virtual targets, and real targets. The terms "simulated target" and "virtual target" refer to any target generated by the AR system and depicted within the FOV of the user. Simulated targets are preferably tracked (e.g., location, orientation, movement) via sensors (e.g., target platform sensors), based on an actual, physical target present in a real-world environment. Virtual targets, on the other hand, preferably do not physically exist in the real-world environment but is created by software in order to appear so. The term "real target" refers to any target that is not generated by the AR system but is physically present in a real-world environment As used herein, the term "target platform" generally refers to any vehicle used to move, transport, or propel a target. Examples of such target platforms may include, without limitation, motor vehicles (e.g., tanks, cars, trucks, motorcycles), railed vehicles (e.g., trains), watercraft (e.g., ships, boats, vessels), amphibious vehicles (e.g., screw-propelled vehicles, hovercraft), aircraft (airplanes, helicopters), spacecraft, and remote-controlled or unmanned vehicles (e.g., unmanned aerial vehicles). Thus, the term "target," as used herein, may also include target platforms.

As used herein, the term "user platform" generally refers to any vehicle used to move, transport, propel, or support a user or trainee of the AR system and may include, without limitation, motor vehicles (e.g., tanks, cars, trucks, motorcycles), railed vehicles (e.g., trains), watercraft (e.g., ships, boats, vessels), amphibious vehicles (e.g., screw-propelled vehicles, hovercraft), aircraft (airplanes, helicopters), spacecraft, and remote-controlled or unmanned vehicles (e.g., unmanned aerial vehicles).

As used herein, the singular forms "a" and "the" may include plural referents, unless the context clearly dictates otherwise. Thus, for example, reference to a "sensor" can include reference to one or more of sensors.

The present disclosure relates generally to AR systems, and more specifically, to AR systems used for field training. In particular, in order to conduct live fire exercises, trainees are situated in a simulated, combative environment and equipped with a loaded firearm to destroy physical targets such as tanks, ships, or remotely controlled drones. This generally offers the trainees a chance to get accustomed to their weapons in order to properly operate them. Unfortunately, live fire training exercises tends to be expensive due to the high costs attributed to administering the exercise and replacing ammunition and destroyed targets. Live fire training exercises may also be dangerous because a projectile may hit an unintended bystander.

As a response to these cost and safety concerns, virtual reality (VR) training has been proposed. VR training generally involves inserting trainees into a virtual environment and providing those trainees with a virtual firearm in order to shoot virtual targets. VR training, however, tends to adversely affect the user's training experience, as VR-based weapons and targets generally do not account for other factors such as environmental conditions (e.g., wind velocity), target inertial movement (e.g., vessel rocking motion), and other target or ammunition parameters, (e.g., projectile shape, weight, dimensions). As such, VR training is generally limited in providing the necessary degree of precision to the trainee.

The embodiments disclosed herein solve this problem by inserting combat trainees into a AR simulated environment. Unlike VR, which involves using virtual targets and virtual weapons, an AR simulated environment generally includes AR elements superimposed in a real world environment, including AR simulated targets. The AR simulated targets accurately mimic movements of a real target (e.g., vehicle, ship) by tracking and obtaining precise measurements from sensors directly coupled to the target such as the target platform. Projectile ballistics may also be accurately determined based on measurements obtained from weapon sensors used in training.

By way of example, during operation, a trainee traveling on a ship or vessel may search for targets at sea such as other vessels or ships. As the trainee encounters these sea targets, the trainee may use a weapon simulator to fire at these targets. The weapon simulator, which may be an artillery mounted on the ship, is preferably configured to provide haptic feedback and recoil. The trainee may view AR simulated targets via a head-worn display device, and the AR simulated targets may accurately track the actual location, orientation, and movement of the targets due to measurements obtained by the sensors attached to the target(s) or target platform(s). Importantly, the AR system disclosed herein may accurately determine whether a target has been hit or impacted by a bullet or projectile by performing projectile ballistic calculations based on the measurements obtained from the sensors attached to the user platform, weapon simulator, and target platform(s). In this manner, the AR system disclosed herein may simulate live fire scenarios with greater precision compared to its VR counterparts.

FIG. 1 is a flow diagram of one embodiment of an AR system 1000 for field training. The AR system 1000 may be used to provide live direct or composite FOV 5000 (shown in FIG. 5) of a physical, real-world environment superimposed with AR graphic elements. The AR graphic elements may then enhance the field training experience by simulating live fire combat with simulated or virtual targets.

As shown in FIG. 1, one embodiment of the AR system 1000 may comprise user platform sensors 125 coupled to a user platform 100, a weapon simulator 200, a head-worn display device 300, target platform sensors 425 coupled to a target platform 400, a microcontroller 500, a computer system 600, and transceivers 700, 800. The user platform 100 may be a vehicle capable of supporting a user or trainee for transport or movement, and the user platform sensors 125 may be any device, system, or component coupled to fixed areas of the user platform 100 for detecting, measuring, and/or tracking location, orientation, or physical movement of the user platform 100 (e.g., pitch, yaw, roll). Importantly, the user platform sensors 125 may generate user platform data 150 by measuring the physical movement or changes of the user platform 100. The user platform data 150 may then be used to accurately track or simulate the movement and orientation of the user platform 100 within a simulated environment such as AR.

Figure 2:
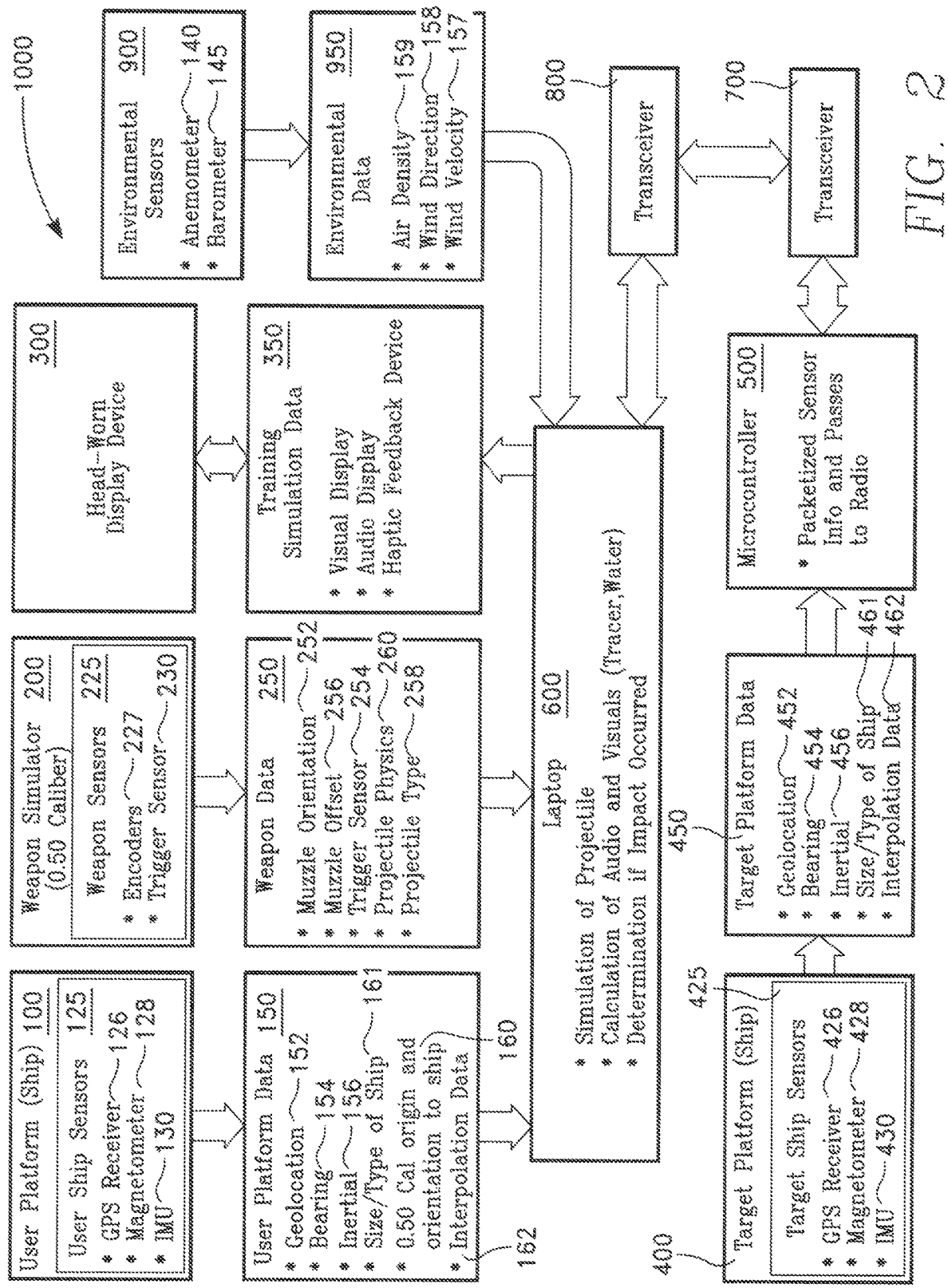
FIG. 2 is a flow diagram another embodiment of the AR system and depicts in detail various embodiments of the user platform data, weapon data, target platform data, and environmental data.

Embodiments of the user platform sensors 125 may include: a GPS receiver 126 (shown in FIG. 2), a magnetometer 128 (shown in FIG. 2), and an inertial measurement unit (IMU) 130 (shown in FIG. 2). The GPS receiver 126 may receive information from GPS satellites to calculate and determine the geographical position of the user platform 100 and thus may be used to generate geolocation data 152 (shown in FIG. 2) of the user platform 100. The magnetometer 128 may measure magnetic forces, such as the earth's magnetism and may be used to obtain bearing 154 (shown in FIG. 2) or orientation data of the user platform 100. The IMU 130 may measure force, angular rate, and sometimes the magnetic field surroundings the user platform 100, using a combination of accelerometers and gyroscopes. The IMU 130 may thus obtain inertial data 156 (shown in FIG. 2) (e.g., pitch, yaw, roll, range).

Similarly, the target platform sensors 425 may be any device, system, or component that detects, measures, and/or tracks, physical movement of a target platform 400, which is preferably mobile, and generates target platform data 450 associated with those measured movements (e.g., location, orientation, inertial movement). Thus, the target platform data 450 may be used to track, simulate, or mimic the location, orientation, and/or movement of the target platform 400 in an AR environment. Like the user platform sensors 125, embodiments of the target platform sensors 425 may include a GPS receiver 426 (shown in FIG. 2) for obtaining geolocation data 452 (shown in FIG. 2), magnetometer 428 (shown in FIG. 2) for obtaining bearing data 454 (shown in FIG. 2) or orientation data, and an IMU 430 (shown in FIG. 2) for measuring inertial movement of the target platform 400.

In some embodiments, the target platform 400 may be controlled or driven by a second user riding the target platform 400 (e.g., second user controlling a vehicle or vessel) in order for the second user to become accustomed to riding the target vehicle, vessel, or aircraft. In an alternative embodiment, the target platform 400 may be unmanned and remotely controlled.

The microcontroller 500 may be a single integrated circuit or device containing a processing core, memory, and programmable input/output functions and is preferably configured to packetize the target platform data 450 for wireless transmission. Thus, in an exemplary embodiment, the microcontroller 500 may be programmed to be in communication with each of the target platform sensors 425. Various embodiments of the microcontroller 500 may also perform additional functions such as monitoring the target platform sensors 425 and compressing or encrypting the target platform data 450.

The weapon simulator 200 may be a reproduction or replica of an intended firearm or artillery used for AR training and may be configured to provide haptic feedback to the user (e.g., recoil). Importantly, the weapon simulator 200 may be situated or moveably mounted on the user platform 100 via a weapon mount 405 (shown in FIG. 4), which may be a weapon component used to moveably affix a weapon simulator 200 onto the user platform 100 for stabilization. Examples of weapon mounts 200 used by the AR system 1000 may include, without limitation, turrets, coaxial weapon mounts, fixed weapon mounts, pintles, and swing mounts (e.g., swing arms). For example, in an exemplary embodiment, the weapon simulator 200 may be an artillery or mounted projectile-firing gun that is movably or rotatably coupled to the user platform 100 via the weapon mount 405 such as a 0.5 caliber rifle mounted on a swing mount on a ship, shown in FIG. 4.

Importantly, the weapon simulator 200 may comprise weapon sensors 225 for obtaining weapon data 250 associated with usage and orientation of the weapon simulator 200. Examples of weapon sensors 225 may include a trigger sensor 230 (shown in FIG. 2) and encoders 227 (shown in FIG. 2). The trigger sensor 230 may be a trigger mechanism for detecting actuation of the weapon simulator 200 (i.e., when the user activates or fires the weapon simulator 200). The encoders 227 are preferably any device or component used for measuring the output angle(s) of the weapon simulator 200 for determining muzzle orientation. For example, the encoders 227 may be operably coupled to the weapon mount 405 in order to measure the output angle or degree to which the weapon simulator 200 is moving or facing. The output angle may then be used in conjunction with the user platform data 150 (e.g., geolocation, bearing, and inertial movement of the user platform 100) to determine muzzle orientation 252. In one embodiment, the output angle may be measured by operably coupling the encoders 227 to the weapon mount 405 and measuring each rotation or movement of the weapon mount 405. In another embodiment, the output angle may be measured by having the encoders 227 coaxially connected with a ship artillery steering wheel drive shaft. By using the output angle and user platform data 150, the AR system 1000 may precisely track the muzzle orientation of the weapon simulator 200 for calculating projectile ballistics.

In various embodiments, the AR system 1000 may comprise other sensors that do not track the physical movements of the user platform 100, target platform 400, or weapon simulator 200. Examples of such sensors include environmental sensors 900 such as an anemometer 140 (shown in FIG. 2) for measuring wind direction 158 (shown in FIG. 2) and wind velocity 157 (shown in FIG. 2) and a barometer 145 for measuring air density 159 (shown in FIG. 2) or air pressure. Thus, these measurements obtained from the environmental sensors 900 may be environmental data 950 used for determining projectile ballistics.

The transceivers 700, 800 may be communication devices, comprising at least one receiver and transmitter and preferably enable a data link for wireless communication. In an exemplary embodiment, the transceivers 700, 800 may operate on various wavelengths such as those used in radio frequency (RF) systems and may provide direct wireless communication between the microcontroller 500 and computer system 600. Here, the first transceiver 700 may be electrically coupled with the microcontroller 500 to receive packetized target platform data 550 from the microcontroller 500, whereas the second transceiver 800 may be electrically coupled to the computer system 600. Thus, packetized target platform data 550 generated by the microcontroller 500 may be transmitted wirelessly to the computer system 600, such that the computer system 600 can determine the location and orientation of the target platform 400 remotely.

The computer system 600 may be a computing device used for performing calculations on projectile ballistics and vehicle platform tracking and may comprise a storage medium having a plurality of machine readable instructions and a processor configured for processing and generating training simulation data 350. In an exemplary embodiment, the training simulation data 350 may be generated based on user platform data 150, weapon data 250, target platform data 450, and environmental data 950 obtained from the user platform sensors 125, weapon sensors 225, target platform sensors 425, and environmental sensors 900, respectively. Thus, the computer system 600 is preferably in direct communication with the user platform sensors 125, the weapon simulator 200, the head-worn display device 300, and the environmental sensors 900, but may be in wireless communication with the target platform sensors 400.

The head-worn display device 300 may be a head mounted display coupled to a headset or headpiece (e.g., goggles, visor) and is preferably configured to depict AR graphic elements associated with the training simulation data 350. The head-worn display device 300 may comprise a transparent medium 510 (shown in FIGS. 6A and 6B), and the AR graphic elements may be projected onto that transparent medium 510. The transparent medium 510 is also preferably disposed or positioned within the FOV 5000 of the user. In this manner, the AR graphic elements may be superimposed on the FOV 5000 of the user in order to enhance the training simulation. Other feedback devices such as audio and haptic may also be incorporated into the head-worn display device 300.

FIG. 2 is a flow diagram another embodiment of the AR system 1000 and depicts in detail various embodiments of the user platform data 150, weapon data 250, target platform data 450, and environmental data 950. As shown in FIG. 2, embodiments of the user platform 100 and target platform 400 may be a ship or vessel. Notably, the user platform 100 and target platform 400 may comprise: GPS receivers 126, 426, magnetometers 128, 428, and IMUs 130, 430, all of which may serve as the user platform sensors 125 and target platform sensors 425. The environmental sensors 900, which may be located on the user platform 100, target platform 400, or anywhere within the vicinity, may comprise an anemometer 140 and/or barometer 145 for obtaining environmental data 950 such as wind velocity 157, wind direction 158, and/or air density 159 measurements. Thus, during operation, user platform data 150 and target platform data 450 obtained from the user platform sensors 125 and target platform sensors 125 may be used to obtain measured values such as: geolocation 152, 452, (e.g., GPS coordinates) of the user platform 100 and target platform 400, orientation/bearing 154, 454 of the user platform 100 and target platform 400, and inertial 156, 456 (i.e., motion detection) for tracking the user platform 100 and target platform 400. Other measured values such as wind velocity 157, wind direction 158, and/or air density 159 may be obtained from the environmental sensors 900.

In an exemplary embodiment, the user platform data 150 and target platform data 450 may also include simulated values such as dimensions (e.g., size/type 161, 461) of the user platform 100 and target platform 400; location 160 of the weapon simulator 200 on the user platform 100 (e.g., 0.50 Cal origin), and interpolation data 162, 462 (data determined based on old user platform data 150 and target platform data 450). These simulated values may be manually inputted to the computer system 600 or preconfigured by the user, such that only movement and tracking data may be transmitted. Thus, in one embodiment, user platform data 150, target platform data 450, and weapon data 250 obtained from the sensors might be the only measured values transmitted to the computer system 600 (e.g., geolocation 152, 452, (GPS coordinates), orientation or bearing 154, 454, inertial 156, 456, muzzle orientation 252). In another embodiment, user platform data 150 target platform data 450, weapon data 250, and environmental data 950 obtained from the sensors might be the only measured values transmitted to the computer system 600 (e.g., geolocation 152, 452, (GPS coordinates), orientation or bearing 154, 454, inertial 156, 456, muzzle orientation 252, wind velocity 157, and wind direction 158).

Regarding the weapon simulator 200, FIG. 2 shows that an embodiment of the weapon simulator 200 may be a 0.5 caliber rifle mounted on a fixed location on the user platform 100 via a weapon mount 405. The weapon sensors 225 may include encoders 227 and a trigger sensor 230 in order to provide weapon data 250 relating to muzzle orientation 252 (i.e., angle and azimuth/altitude) and actuation of the trigger sensor 230. Other weapon data 250 may also be transmitted to the computer system 600 and may include simulated values such as: muzzle offset 256 (length of muzzle from initial velocity of projectile) and projectile type (e.g., 0.5 bullet) 258, and projectile properties 260 (e.g., projectile shape, length, weight). Other embodiments of weapon data 250 involving simulated values may be manually inputted directly to the computer system 600 or preconfigured by the user, such that the only measured values (e.g., muzzle orientation 252 and trigger sensor 230) may be transmitted to the computer system 600.

Regarding the microcontroller 500 and transceivers 700, 800, as discussed above, the microcontroller 500 may packetize the target platform data 450 for wireless transmission. In particular, the microcontroller 500 may receive target platform data 450 from each of the target platform sensors 425 and may convert the target platform data 450 into packetized target platform data 550 for wireless transmission to the first transceiver 700. Upon receiving the packetized target platform data 550, the first transceiver 700 may wirelessly transmit the packetized target platform data 550 to the second transceiver 800, and upon receipt, the second transceiver 800 may transmit the packetized target platform data 550 to the computer system 600 for unpacking and processing.

Regarding the computer system 600, which may be in direct communication with the user platform sensors 125, weapon simulator 200, head-worn display device 300, and environmental sensors 900, the computer system 600 may receive the packetized target platform data 550, user platform data 150, weapon data 250, and environmental data 950 and process such data in order to generate training simulation data 350. Based on these data, the computer system 600 may calculate and determine projectile ballistics within the AR simulated environment, including severity and location of a projectile impact. Details on how the computer system 600 may determine training simulation data 350 is described in more detail below in FIGS. 7A to 7G.

After generating the training simulation data 350, this data may be transmitted to the head-worn display device 300 and depicted as AR graphic elements. The AR graphic elements may then be projected onto the transparent medium 510, which will preferably permit the AR reality system 1000 to provide live, composite FOV 5000 of a physical, real-world environment superimposed with AR graphic elements. The AR graphic elements may then be used to enhance the field training by simulating live fire combat with real or virtual targets.

Figure 3:
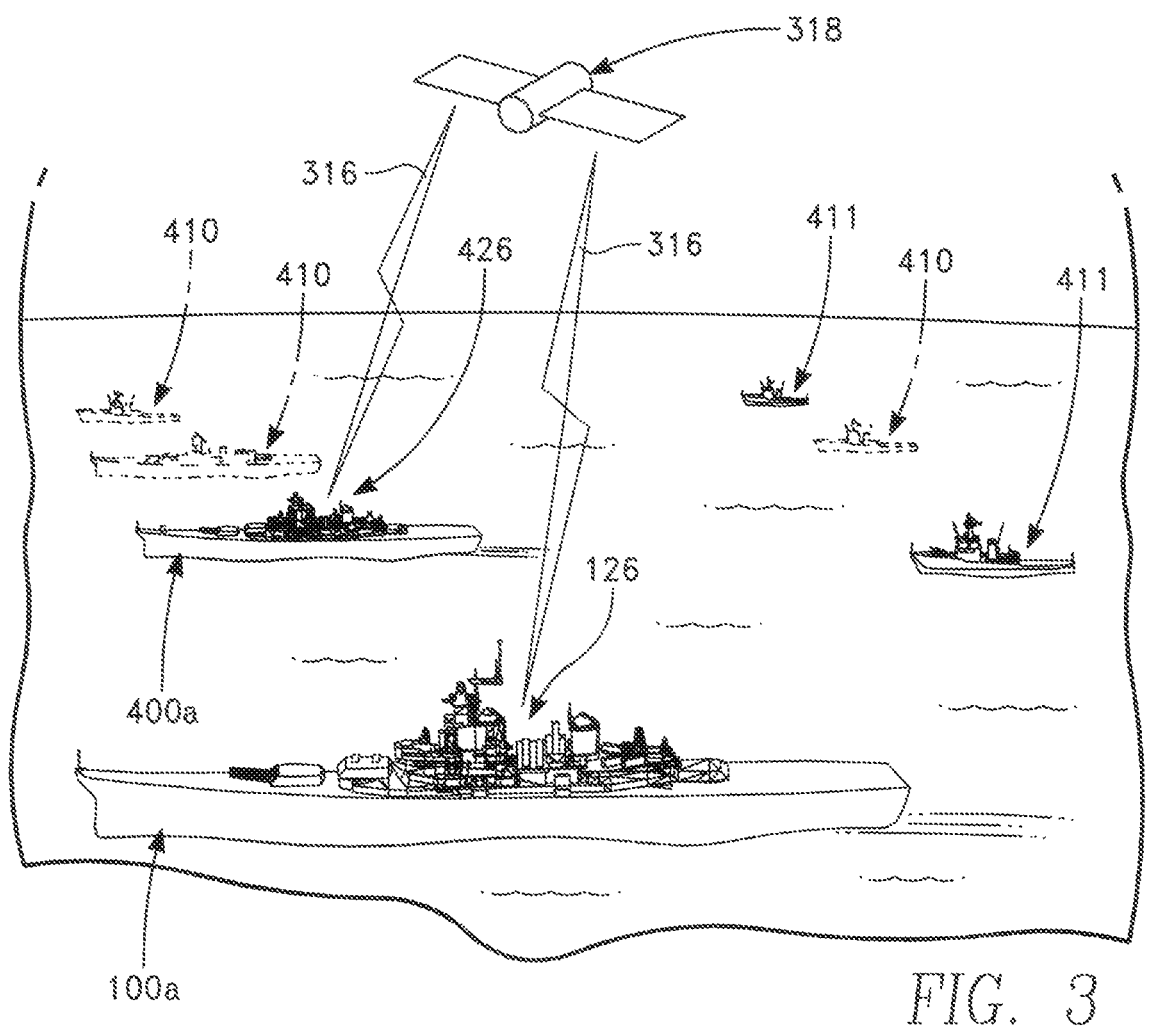
FIG. 3 is an illustration of an embodiment of the AR system being used in a field training exercise.

FIG. 3 is an illustration of an embodiment of the AR system 1000 being used in a field training exercise. As shown in FIG. 3, one embodiment of the AR system 1000 may be used with a user platform 100a, target platform 400a (which is preferably a simulated target), and virtual targets 410, all of which may represent ships or vessels. The GPS receiver 126 located on the user platform 100a may receive GPS signals 316 from a navigational satellite 318 in order to obtain geolocation data 152. The magnetometer 128 and IMU 130, both located within the user platform 100a may also be used to obtain bearing data 154 and inertial data 156, respectively.

Similarly, in the embodiment shown in FIG. 3, the target platform 400a may also be a vessel, comprising a GPS receiver 426 magnetometer 428 and IMU 430. The GPS receiver 426 may receive GPS signals 316 from the navigational satellite 318 in order to obtain geolocation data 452. The magnetometer 428 and IMU 430 may be used to obtain bearing data 454 and inertial data 456 associated with the target platform 400a. These signals may be used to simulate the movement and tracking of the target platform 400a in order for a simulated target to mimic the location and movement of the target platform 400a.

FIG. 3 also shows that, when viewing through the FOV 5000 of the AR system 1000, embodiments of the AR system 1000 may include virtual targets 410. Virtual targets 410 may be targets that do not physical exist in the real-world environment but are preferably generated by the AR system 1000. The virtual targets 410 may also resemble other target platforms such as ships and vessels. The virtual targets 410 may be positioned within the vicinity of the user platform 100a and may move at the direction or control of the users. Unlike the simulated target platform 400a, the virtual targets 410 generally do not rely on target platform data 450 for tracking. Thus, the virtual targets 410 may be used to provide trainees with multiple targets at a fraction of the cost. In other embodiments, real targets 411 (i.e., targets without sensors) may also be used, though they are preferably not tracked by the AR system 1000. Although FIG. 3 only shows a single user platform 100a and a single target platform 400a, various embodiments of the AR system 1000 may utilize multiple user platforms 100 and multiple target platforms 400.

Figure 4:
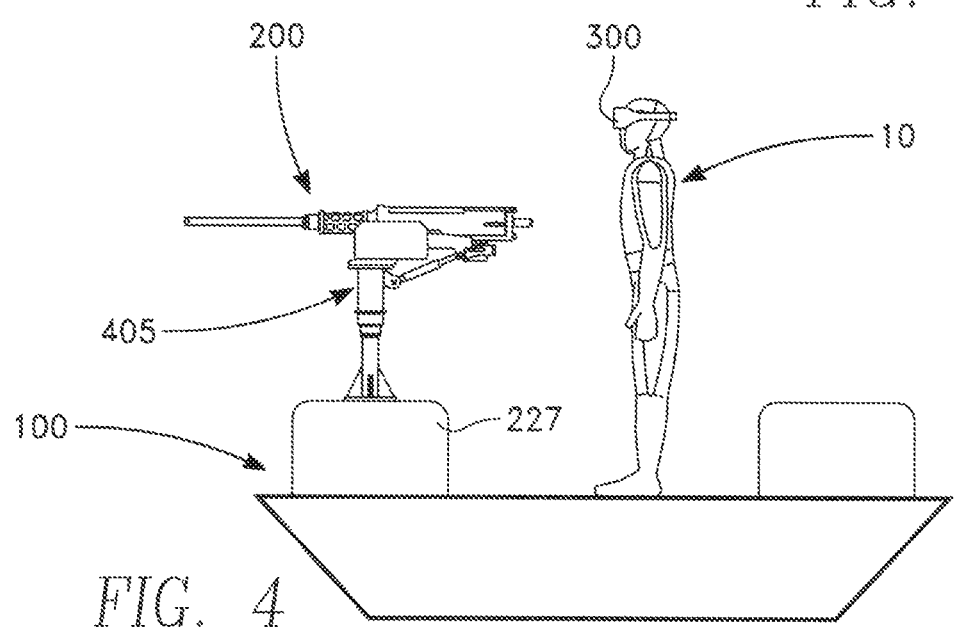
FIG. 4 is an illustrations of an embodiment of the AR system being used in a field training exercise and shows how a user utilizes a weapon simulator on a user platform.

FIG. 4 is an illustrations of an embodiment of the AR system being 1000 used in a field training exercise and shows how a user 10 may utilize a weapon simulator 200 on a user platform 100. As shown in FIG. 4, one embodiment of the AR system 1000 may comprise weapon simulator 200 mounted on a user platform 100 (e.g., ship, vessel) via a weapon mount 405 and a head-worn display device 300. As discussed above, the weapon simulator 200 may comprise weapon sensors 225 such as a trigger sensor 230 and encoders 227. These trigger sensor 230 and encoders 227 may allow weapon data 250 associated with muzzle orientation 252 and actuation of the trigger sensor 230 to be transmitted to the computer system 600 for processing.

FIG. 4 also shows that embodiments of the weapon simulator 200 are preferably an artillery or mounted projectile-firing gun. This may allow the encoders 227, which may be operably coupled to the weapon mount 405, to measure the output angle of the weapon simulator 200 and use that measured output angle along with the user platform data 150 to determine muzzle orientation. Thus, given that the weapon simulator 200 is located on a fixed location with respect to the user platform 100a via the weapon mount 405, the encoders 227 can determine muzzle orientation based on: (1) the output angle of the weapon simulator 200 and (2) user platform data 150 associated with geolocation, bearing, and inertial movement of the user platform 100.

Figure 5:
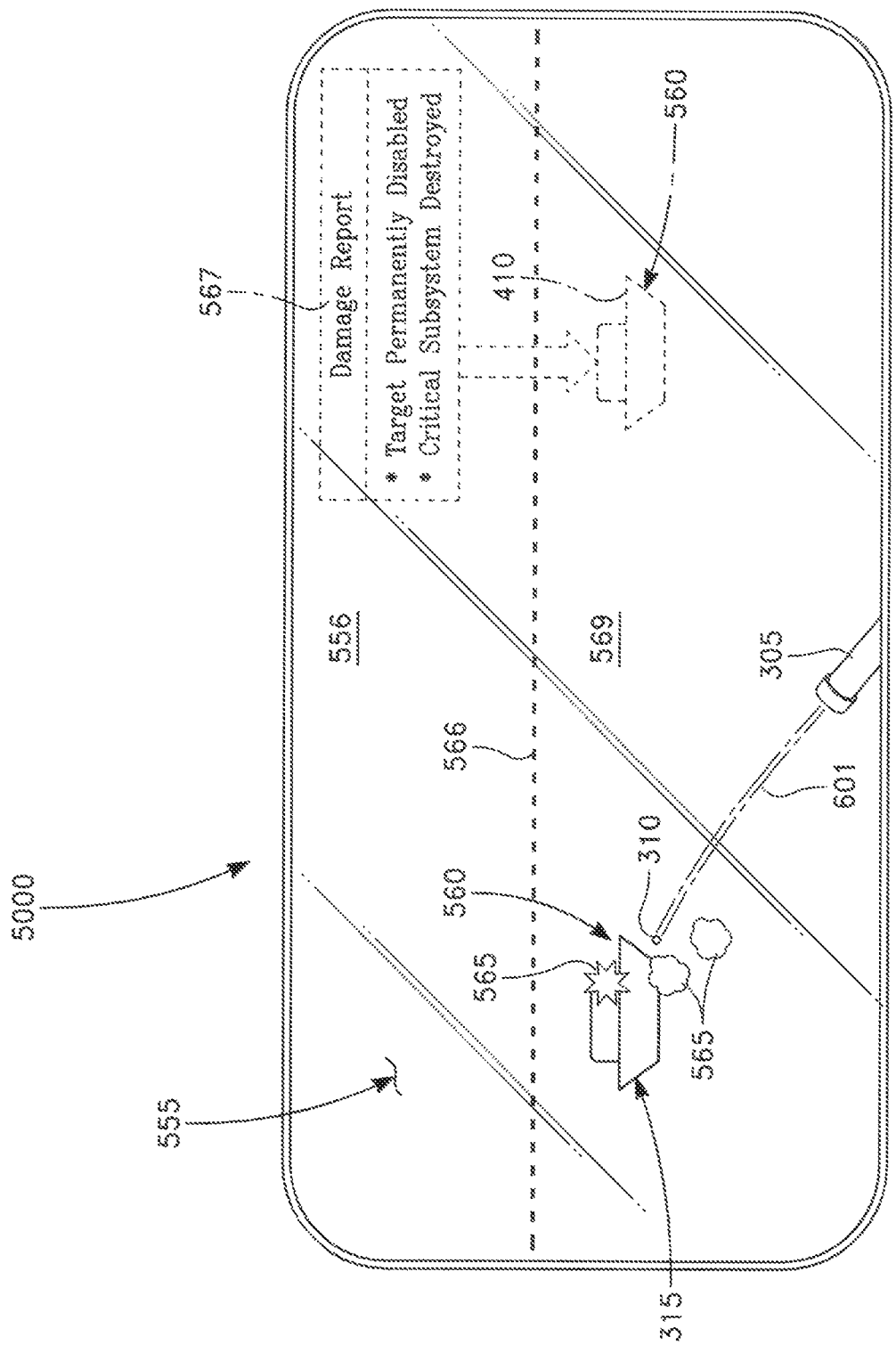
FIG. 5 is an illustration of a FOV of a user viewed through an embodiment of the head-worn display device.

FIG. 5 is an illustration of a FOV 5000 of a user viewed through an embodiment of the head-worn display device 300. As shown in FIG. 5, the head-worn display device 300 may allow the user to directly view a real world environment 555 through a transparent medium 510 along with AR graphic elements 560 generated by a display processor mounted within the head-worn display device 300. Thus, the user may view features of the real world environment (e.g., sky 556 and sea 569 divided by the horizon 566) superimposed with AR graphic elements 560 such as simulated targets 315 and virtual targets 410. The AR graphic elements 560 may be shown on an AR overlay projected on the transparent medium 510 and may be generated based on training simulation data 350 generated by the computer system 600. The training simulation data 350 may be generated based on user platform data 150 obtained from the user platform sensors 125, weapon data 250 obtained from the weapon sensors 225, target platform data 450 obtained by the target platform sensors 425, and environmental data 950 obtained by the environmental sensors 900. In various embodiments, a simulated firearm 305 simulating the weapon simulator 200 may also be depicted as an AR graphic element 560 on the AR overlay near the bottom of the FOV 5000. When using the AR system 1000, objects such as simulated bullets 310, projectile path of travel 601, and simulated targets 315 may be displayed on the FOV 5000.

In various embodiments, visual indications of projectile ballistics such as severity and location of a projectile impact 565 may also be depicted on the FOV 5000. In various embodiments, designated targets can also be selected manually, and metadata 567 associated with the objects (e.g., simulated firearm 305, simulated bullets 310, simulated targets 315, virtual targets 410) may be depicted as AR graphic elements 560. In an exemplary embodiment, metadata 567 associated with each selected object may be displayed next to that object and may provide information associated with that object (e.g., status of target, projectile impact verification).

Figure 6A:
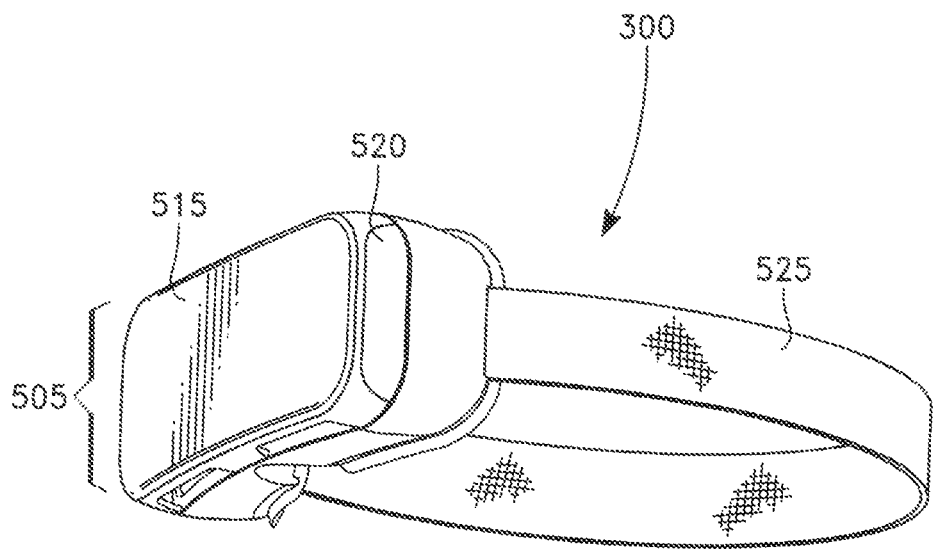
FIGS. 6A and 6B are illustrations of an embodiment of the head-worn display device.
Figure 6B:
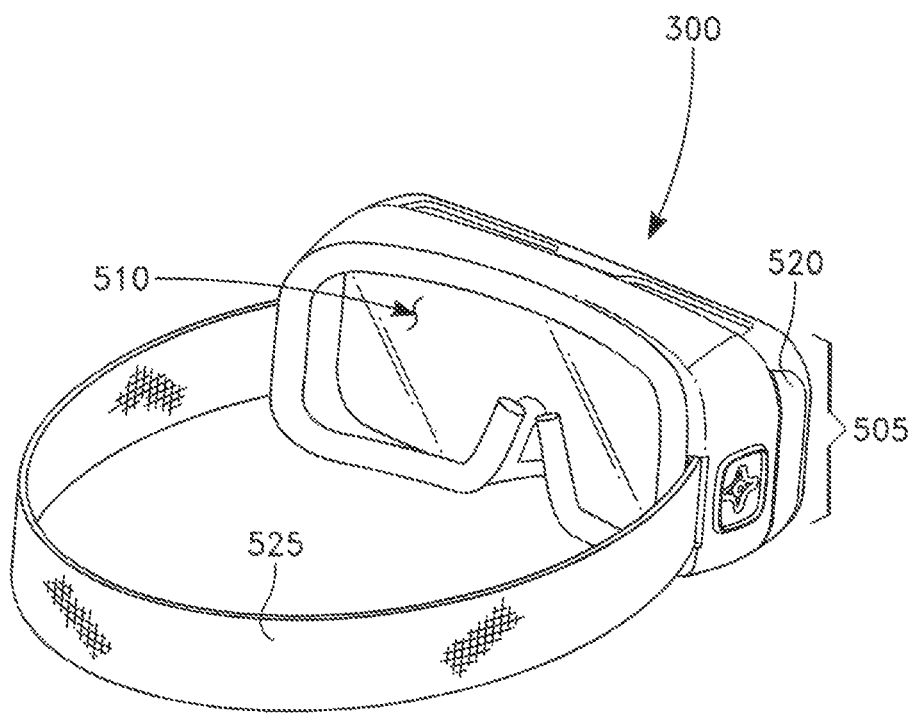

FIGS. 6A and 6B are illustrations of one embodiment of the head-worn display device 300. As shown in FIGS. 6A and 6B, one embodiment of the head-worn display device 300 may be a headpiece 505 comprising, transparent medium 510, lens 515, visual display 520, and a coupling structure 525. The visual display 520 may be situated relative to the viewing angle of wearer, and the coupling structure 525 may be adapted to hold and secure the head-worn display 300 in relation to the FOV 5000 of the wearer. In various embodiments, the head worn display 300 may also comprise a transceiver or transmitter/receiver (not shown), which may provide communication between the computer system 600 and head-worn display device 300. This will preferably permit the computer system 600 to provide various communication data such as training simulation data 350, including visual data signals, data representations, user inputs, and the like.

Additionally, embodiments of the head-worn display device 300 may permit viewing through the lens 515 with an AR visual overlay. In an alternative embodiment, the head-worn display device 300 may be configured to selectively prohibit light from entering through the lens 515 thereby implementing AR visualization by displaying a concurrent video image captured from a camera. In various embodiments, AR graphical user interface software may be used to execute various functions such as placing a crosshair or visual indication on the FOV 5000 or tracking objects via coordinate positions. In an exemplary embodiment, the head-worn display device 300 may comprise a machine readable code for tracking objects on the AR visual overlay and depicting AR graphic elements on certain portions of the AR visual overlay.

Figure 7D:
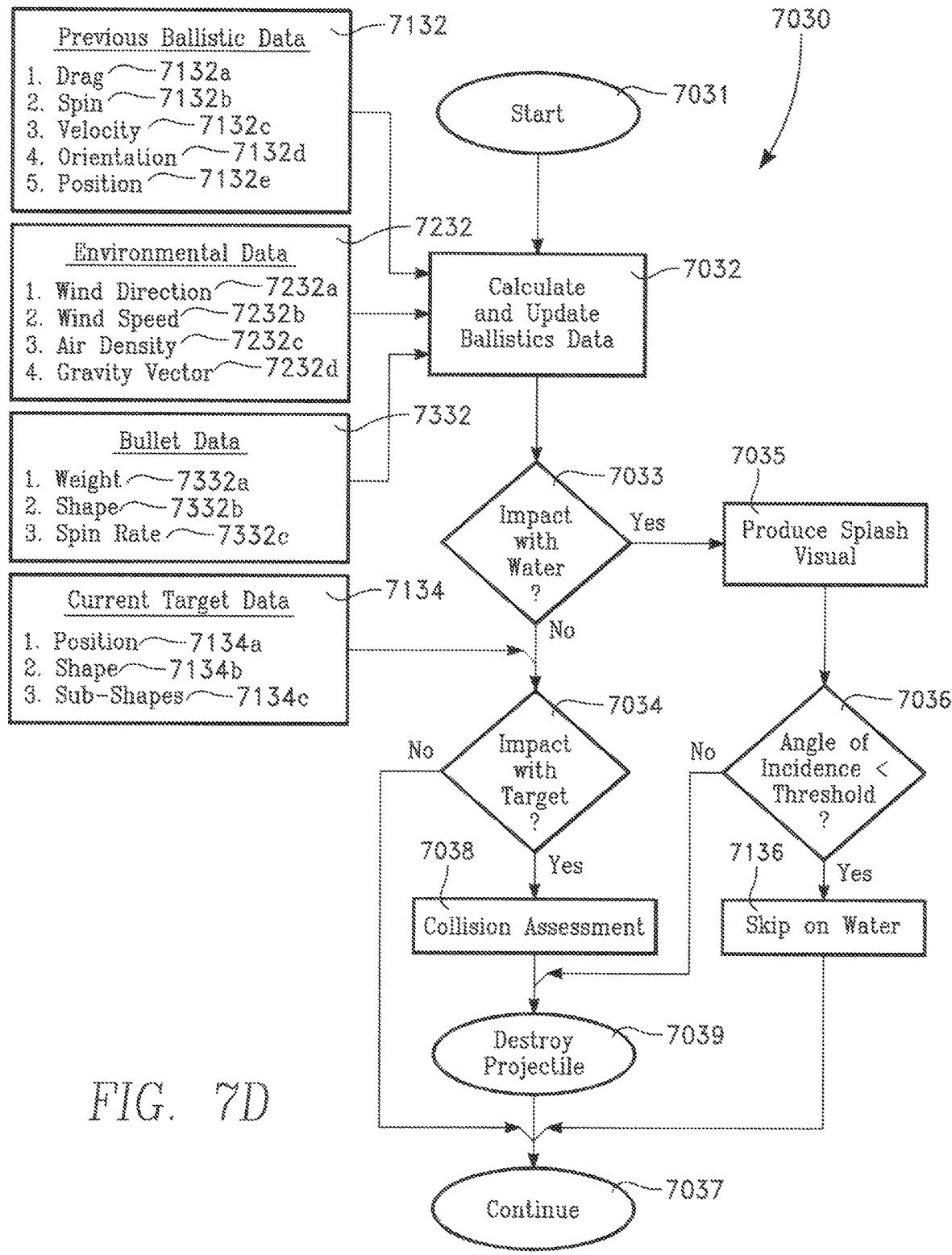

FIGS. 7A to 7G are illustrations of embodiments of a process and routines for generating training simulation data by the computer system. In particular, FIG. 7A depicts one embodiment of a process 7000 for generating training simulation data 350, based on a fixed framerate, which may include determining projectile ballistics and tracking of the user platform 100 and target platform 400. Within the process 7000, several routines may be performed for each frame to determine the AR simulation state. For example, as shown in FIG. 7A, one embodiment of the process 7000 may comprise routines 7010, 7020, 7030, 7040, 7050, 7060, all of which begin after step 7005 and before step 7095.

At step 7005 of the process 7000, the AR system 1000 may proceed in performing routine 7010 by updating measurements obtained from the environmental sensors 900. As discussed above, various sensors of the AR system 1000 may be used to monitor and update environmental parameters, including wind velocity 157, wind direction 158, and air density 159. Such measurements may be used for providing environmental data 950 and thus accurately calculating projectile ballistics. Additional details of routine 7010 are discussed in FIG. 7B below.

After the environmental data 950 has been updated, the AR system 1000 may perform routine 7020 by calculating and updating the user and target positions and orientations. Here, routine 7020 allows the computer system 600 to determine the positions of the user platform 100 and target platform 400 by utilizing the user platform data 150 and target platform data 425 obtained by the user platform sensors 125 and target platform sensors 425. For example, upon receiving new data from the sensors for determining absolute position (e.g., GPS data from the GPS receiver 126, bearing or orientation data from the magnetometer 128, inertial movement data from the IMU 130), geolocation and orientation data may be obtained in order to track the movement and location of the user platform 100 and target platform 400. In the absence of such measurements, various processes may be performed to determine the approximate location and position of the user platform 100 and target platform 400 such as interpolation or calculations based on previous position data (e.g., calculated linear velocity, calculated angular velocity). In various embodiments, this routine 7020 may be performed for multiple tracked simulated targets.

On step 7030, the AR system 1000 may update ballistics calculations by determining the location(s) of a projectile used in the training simulation data 350. Here, the AR system 1000 may determine ballistics calculations for the projectile based on previous ballistics data (e.g., position, acceleration, velocity, trajectory), environmental data 950 (e.g., wind velocity 157, wind direction 158, and air density 159), and projectile parameters (e.g., shape of projectile, weight of projectile). Routine 7030 may repeat for each projectile created in the simulation.

Next, the AR system 1000 may perform routine 7040, which may be collision assessment. Here, this routine 7040 may be used to determine whether to remove the target platform 400 from the training simulation based on damage affected by a projectile impact or collision. Preferably, the damage to the target platform 400 may be based on the collision data and its effect on the target platform 400 (e.g., whether the projectile collided with a vulnerable position on the target platform 400, amount of damage).

After assessing the collision of the projectile (routine 7040), the AR system 1000 may then perform routines 7050, 7060. Routine 7050 may be processing user inputs such as trigger actuation and user interface interaction. Routine 7060 may be providing feedback to the user (e.g., visual or haptic feedback). After completing routines 7010, 7020, 7030, 7040, 7050, 7060, the AR system 1000 may proceed to the next frame of the training simulation by performing process 7000 again.

FIG. 7B is an illustration of one embodiment of a routine 7010 for updating environmental data. Specifically, FIG. 7B shows that, at step 7011 of the routine 7010, the AR system 1000 may proceed to step 7012, which may be reading and updating the environmental data 950. Here, the AR system 1000 preferably polls or reads any environmental sensors 900 to monitor and update environmental parameters such as wind velocity 157, wind direction 158, and air density 159. This environmental data 950 may be used in ballistics or dead reckoning calculations (i.e., interpolation). Once measurements of each of the environmental sensors 900 are obtained and updated, step 7013 may be performed to complete the routine 7010 and continue onto the next routine 7020.

FIG. 7C is an illustration of an embodiment of a routine 7020 for updating a position of a target or user. As mentioned above, FIG. 7C depicts the steps of routine 7020 for determining the geolocation and three-dimensional orientation of the user platform 100 and target platform 400. At step 7021 of the routine 7020, the AR system 1000 may proceed to step 7022 to determine whether a new data is available for the user platform 100 and/or target platform 400. If new data regarding the geolocation and three-dimensional orientation of the user platform 100 or target platform 400 is available for absolute position (e.g., new GPS information, high-confidence bearing), the AR system 1000 may perform step 7023 by updating the "true" position of the target within the training simulation data 350, and completing routine 7020 (step 7027). However, in the absence of any new geolocation and three-dimensional orientation data, the AR system 1000 may utilize dead reckoning parameters (e.g., IMU/accelerometer, rudder angle, throttle, ocean current, and previous position) by first determining whether dead reckoning parameters are available (step 7024). If dead reckoning parameters are available, the AR system 1000 may update geolocation and orientation data of the user platform 100 and/or target platform 400 (step 7025) and then complete the routine 7020 (step 7027). On the other hand, in the absence of availability of reliable dead reckoning parameters, the AR system 1000 may perform step 7026, which is updating the geolocation and orientation of the user platform 100 and/or target platform 400 based on interpolation or previous data (calculated linear velocity, calculated angular velocity, etc. . . . ) to produce an approximate position of the user or simulated target. Thereafter, routine 7020 is preferably complete at step 7027. Preferably, routine 7020 may be performed for each tracked target and user within the AR simulation.

FIG. 7D is an illustration of an embodiment of a routine 7030 for updating a position of a projectile. Here, the routine 7030 may be used to calculate ballistics data in order to determine the location of a projectile for the current frame. The ballistics data may be determined based on various parameters such as previous ballistics data (e.g., position, acceleration, velocity, trajectory), environment data 950, muzzle orientation 252, and projectile parameters.

As shown in FIG. 7D, routine 7030 may comprise steps 7031, 7032, 7033, 7034, 7035, 7036, 7037, 7038, 7039, 7136. At the beginning of routine 7030 (step 7031), the AR system 1000 may proceed to step 7032 in order to calculate and update the ballistics data. Here, the ballistics data may be updated based on various parameters, including, previous ballistics data 7132, environment data 7232, and projectile data 7332. Specifically, as shown in FIG. 7D, previous ballistics data 7132 may comprise several variables such as drag 7132a, spin 7132b, velocity 7132c, orientation 7132d, and position 7132e. Drag 7132a may be resistance (e.g., air, water) based on force experienced by a projectile moving through a fluid or gas at relatively large velocity. Spin 7132b (i.e., angular momentum) may be the velocity of rotation of the projectile around a particular axis. Spin 7132b may also be calculated based on the following equation:

$$\text{mass} \times \text{velocity} \times \text{radius}$$

where radius is the distance from the spinning object to the axis. Velocity 7132c may be the rate of change of a position of the projectile with respect to a reference point and is generally based on a function of time. Velocity 7132c may be equivalent to a projectile's speed and direction of motion. Orientation 7132e may be the relative physical position or direction of the projectile, while position may be where an object is located in a three dimensional space.

Environmental data 7232 may be several variables that affect drag of the projectile, including wind direction 7232a, wind speed 7232b, air density 7232c, and gravity vector 7232d. Wind direction 7232a is generally the direction from which wind originates and may be measured in degrees clockwise (or counterclockwise) from a vector such as true north. Wind speed 7232b may be the velocity of wind energy flowing at a particular direction and may be determined based on measurements from the anemometer 140. Air density 7232c may be the mass of air per unit of volume it occupies and generally affects drag 7132a of the moving projectile (i.e., the denser the air, the slower the projectile moves due to heavier molecules) and may be determined based on measurements from the barometer 145. The gravity vector 7232d may be the magnitude and direction of gravity (i.e., acceleration due to gravity, force of gravity, velocity, and displacement). For example, the gravity vector may pull the projectile downwards with a magnitude of 9.8 m/s².

Projectile data 7332 may comprise parameters of the projectile such as weight 7332a, shape 7332b, and rifling spin rate 7332c. Weight 7332a may be the measure of force of the projectile caused by a gravitational field and may be based on the mass and density of the projectile. Mass and density data may be inputted into the computer system 600 by the user. Shape 7332b may be the external form of the projectile and may comprise at least a conical shape for minimizing drag 7132a. Spin rate 7332c may be the spin rate of a projectile based on the twist of the rifling (i.e., helical groove pattern machined into the internal surface of a gun barrel). Accordingly, the above data and parameters may be used to calculate and update the current ballistics data of a projectile.

FIG. 7D also shows the steps for determining whether a projectile is removed from the training simulation due to an impact or collision with the environment or target(s). Specifically, after updating ballistics data (step 7032), the AR system 1000 may determine whether the projectile impacts or collides with the environment such as water (step 7033). If the projectile does not impact water, the AR system 1000 may proceed to step 7034 to determine whether the projectile impacts or collides with a target. This may be based on the ballistics data (step 7032) and current target data 7134 (i.e., target's position/orientation 7134*a*, target shape 7134*b*, and any sub-shapes 7134*c*). If the projectile does not impact a target (step 7034), the routine 7030 may complete at step 7037.

On the other hand, if the projectile impacts a target (step 7034), the AR system 1000 may perform a collision assessment (step 7038). The collision assessment may be based on routine 7040, which is shown in FIG. 7E below and may include a visual indication in the FOV 5000, depicting the severity and location of the projectile impact. Examples of such may include destroying the target (or a portion thereof) or disabling a target (shown in FIG. 5). After performing a collision assessment at step 7038, the projectile may be removed or destroyed (step 7039) and the routine 7030 may be completed (step 7037).

Referring back to step 7033, if the projectile impacts water, the AR system 1000 may generate or produce an AR graphic effect such as a splash visual within the FOV 5000 (step 7035), indicating a collision with the water environment. Thereafter, the AR system 1000 may proceed to step 7036 to determine whether the angle of incidence of the collision with water is less than a particular threshold. This may help determine whether the projectile should skip on water. For example, if the angle of incidence is not less than the threshold, the projectile may be removed or destroyed. On the other hand, if the angle of incidence is less than a threshold, then the AR system 1000 may depict the projectile skipping on water (step 7136). The routine 7030 thereafter may complete at step 7037. Preferably, the above routine 7030 is performed for each projectile created within the training simulation.

FIG. 7E is an illustration of an embodiment of a routine 7040 for assessing a collision of a projectile. Here, the routine 7040 may be used to determine how a target may be removed from the training simulation based on damage incurred from the projectile. In particular, depending upon the effect of the projectile onto the target, the target may be removed from the FOV 5000 of the training simulation.

As shown in FIG. 7E, routine 7040 may comprise steps 7041, 7042, 7043, 7044, 7045, 7046. At the beginning of the routine 7040 in step 7041, the AR system 1000 may proceed to step 7042 to determine whether a collision by a projectile occurred. If the AR system 1000 determines that no collision has occurred by the projectile, the AR system 1000 may proceed to step 7043 in order to complete the routine 7040. On the other hand, if the AR system 1000 determines that a collision has occurred by the projectile, the AR system 1000 may proceed to step 7044 where a damage assessment report is made. There, the AR system 1000 may assess the severity and location of the projectile impact or damage caused by the projectile to determine its effect (i.e., whether the projectile impacted a vulnerable position on the target, whether the projectile glanced the collision, and/or whether projectile caused a destructive impact). Depending upon the effect of the projectile onto the target, the AR system 1000 may then proceed to step 7045 to determine whether the target is destroyed. If the target is destroyed, the AR system 1000 may proceed to step 7046 in order remove the target from the simulation. Once the target is removed, the AR system 1000 may complete the routine 7040 (step 7043). On the other hand, if the target is not destroyed, the AR system 1000 complete the routine 7040 in step 7043.

FIG. 7F is an illustration of an embodiment of a routine 7050 for handling user inputs. Here, the routine 7050 may be used to read and process user inputs (e.g., trigger actuation, user interface interaction). As shown in FIG. 7F, routine 7050 may comprise steps 7051, 7052, 7053, 7054. At the beginning of the routine 7050 in step 7041, the AR system 1000 may proceed to step 7052 in order to read each input from the user. Depending on the user input, the AR system 1000 may begin processing various inputs in step 7053. Examples of such user inputs may include, without limitation, creating a projectile (e.g., bullet), adjusting feedback settings (e.g., haptic feedback of weapon simulator 200), and respawning targets. After processing each user input, the AR system 1000 complete the routine 7050 in step 7054.

FIG. 7G is an illustration of an embodiment of a routine 7060 for providing feedback. Specifically, this routine 7060 may be used to provide visual and/or haptic feedback to the user when utilizing the AR system 1000. As shown in FIG. 7G, routine 7060 may comprise steps 7061, 7062, 7063, 7064, 7065, 7066, 7067, 7068. At the beginning of the routine 7060 in step 7061, the AR system 1000 may proceed to step 7062 to determine whether a collision occurred. If no collision has occurred, then the AR system 1000 may proceed to step 7064. On the other hand, if a collision has occurred with a projectile, the AR system 1000 may generate a visual feedback to the user, depicting a projectile collision (step 7063). From there, the routine 7060 may then proceed to step 7064.

At step 7064, FIG. 7G shows that the AR system 1000 may determine whether a projectile such as a bullet is fired. If no projectile if fired, then the AR system 1000 may proceed to step 7066 to determine whether a target has been destroyed. This may be based on the results from routine 7030 in FIG. 7D, which depicts the process for determining ballistics calculations. On the other hand, if a projectile was fired, the AR system 1000 may produce haptic feedback to the user (step 7065) and then proceed to step 7066.

Finally, at step 7066, the AR system 1000 may determine whether a target has been destroyed. This may be based on the results in routine 7030, as discussed above. If a target was not destroyed, the AR system 1000 may complete the routine 7060 at step 7068. On the other hand, if a target was destroyed, the AR system 1000 may provide a damage report overlay to the user (step 7067) and then complete the routine 7060 at step 7068. The damage report overlay may be any visual indication providing an assessment as to the amount of damage the target has sustained. The damage report overlay may be based on the damage assessment report generated in step 7044 in FIG. 7E.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The components, steps, features, objects, benefits, and advantages that have been discussed are merely illustrative, and none of them, nor the discussions relating to them, are intended to limit the scope of protection in any way. Numerous other embodiments are also contemplated, including embodiments that have fewer, additional, and/or different components, steps features, objects, benefits, and advantages. The components and steps may also be arranged and ordered differently.

The foregoing description of the preferred embodiment has been presented for the purposes of illustration and description. While multiple embodiments are disclosed, still other embodiments will become apparent to those skilled in the art from the above detailed description. As will be realized, the scope of protection is capable of modifications in various obvious aspects, all without departing from the spirit and scope of the present disclosure. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims. The scope of protection is limited solely by the claims that now follow, and that scope is intended to be broad as is reasonably consistent with the language that is used in the claims. The scope of protection is also intended to be broad to encompass all structural and functional equivalents.

What is claimed as new and desired to be protected by Letters Patent is set forth in the appended claims:

1. An augmented reality (AR) system for field training, comprising:
    a plurality of user platform sensors coupled to a user platform and configured to provide user platform data;
    a weapon simulator movably mounted on said user platform via a weapon mount and comprising a plurality of weapon sensors configured to provide weapon data;
    a head-worn display device configured to depict AR graphic elements associated with training simulation data by projecting said AR graphic elements on a transparent medium disposed within a field of view (FOV) of a user, such that said AR graphic elements are superimposed with an environment viewable by said user;
    a plurality of target platform sensors coupled to a target platform and configured to provide target platform data; and
    a computer system, comprising a storage medium having a plurality of machine readable instructions and a processor configured to generate said training simulation data based on said user platform data, said weapon data, and said target platform data by executing said plurality of machine readable instructions, wherein said training simulation data is transmitted to said head-worn display device;
    wherein said target platform is a first vehicle and wherein said plurality of target platform sensors comprises: a first global positioning system (GPS) receiver, a first magnetometer, and a first inertial measurement unit (IMU), such that said plurality of target platform sensors provides said target platform data that tracks a first location, a first orientation, and a first inertial movement of said target platform;
    wherein said user platform is a second vehicle configured to transport a user of said AR system and wherein said plurality of user platform sensors comprises: a second GPS receiver, a second magnetometer, and a second IMU, such that said plurality of user platform sensors provides said user platform data that tracks a second location, a second orientation, and a second inertial movement of said user platform;
    wherein said weapon simulator is a replica of a firearm configured to provide recoil and wherein said plurality of weapon sensors comprises a trigger sensor and one or more encoders, such that said plurality of weapon sensors provides said weapon data that track a trigger actuation and a muzzle orientation of said weapon simulator; and
    wherein at least one of said AR graphic elements is a simulated target configured to mimic location and movement of said target platform via said target platform data.

2. The AR system, according to claim 1, characterized in that
    said target platform data comprises:
        a first geolocation data obtained from said first GPS receiver;
        a first bearing data obtained from said first magnetometer; and
        a first inertial data obtained from said first IMU.

3. The AR system, according to claim 1, characterized in that said processor is configured to generate, based on said target platform data, a first interpolation data for tracking said target platform.

4. The AR system, according to claim 1, characterized in that
    said user platform data comprises:
        a second geolocation data obtained from said second GPS receiver;
        a second bearing data obtained from said second magnetometer; and
        a second inertial data obtained from said second IMU.

5. The AR system, according to claim 1, characterized in that said processor is configured to generate, based on said user platform data, a second interpolation data for tracking said user platform.

6. The AR system, according to claim 1, characterized in that said plurality of weapon sensors comprises: a trigger sensor and one or more encoders; and
    wherein said weapon data comprises:
        a muzzle orientation data obtained from said one or more encoders; and
        a trigger data associated with said trigger actuation of said trigger sensor.

7. The AR system, according to claim 1, further comprising a microcontroller in electrical communication with said target platform sensors and configured to packetize said target platform data for wireless transmission.

8. The AR system, according to claim 1, characterized in that, when generating said training simulation data, said processor determines a projectile ballistics, including a severity and location of a projectile impact; and
    wherein at least one of said AR graphic elements projected on said head-worn display device provides a visual indication in said FOV of said severity and location of said projectile impact.

9. An AR system for field training, comprising:
    a plurality of user platform sensors coupled to a user platform and configured to provide user platform data for tracking movement of said user platform;

a weapon simulator movably mounted on said user platform via a weapon mount and comprising a plurality of weapon sensors configured to provide weapon data;

a head-worn display device for depicting AR graphic elements associated with training simulation data by projecting said AR graphic elements on a transparent medium disposed within a FOV of a user, such that said AR graphic elements are superimposed with an environment viewable by said user;

a plurality of target platform sensors coupled to a target platform and configured to provide target platform data for tracking movement of said target platform;

a microcontroller in electrical communication with said target platform sensors and configured to packetize said target platform data for wireless transmission; and a computer system, comprising a storage medium having a plurality of machine readable instructions and a processor configured to generate said training simulation data based on said user platform data, said weapon data, and said target platform data by executing said plurality of machine readable instructions, wherein said training simulation data is transmitted to said head-worn display device and includes projectile ballistics;

wherein said target platform is a first vehicle and wherein said plurality of target platform sensors comprises: a first GPS receiver, a first magnetometer, and a first IMU, such that said plurality of tart platform sensors provides said target platform data that tracks a first location, a first orientation, and a first inertial movement of said target platform;

wherein said user platform is a second vehicle configured to transport a user of said AR system and wherein said plurality of user platform sensors comprises: a second GPS receiver, a second magnetometer, and a second IMU, such that said plurality of user platform sensors provides said user platform data that tracks a second location, a second orientation, and a second inertial movement of said user platform;

wherein said weapon simulator is a replica of a firearm configured to provide recoil and wherein said plurality of weapon sensors comprises a trigger sensor and one or more encoders, such that said plurality of weapon sensors provides said weapon data that track a trigger actuation and a muzzle orientation of said weapon simulator;

wherein at least one of said AR graphic elements of said head-worn display device provides a visual indication in said FOV of a severity and location of a projectile impact; and wherein at least another of said AR graphic elements is a simulated target configured to mimic location and movement of said target platform via said target platform data.

10. The AR system, according to claim 9, characterized in that
said target platform data comprises:
a first geolocation data obtained from said first GPS receiver;
a first bearing data obtained from said first magnetometer;
a first inertial data obtained from said first IMU; and
a first interpolation data generated by said processor, based on said first geolocation data, said first bearing data, and said first inertial data.

11. The AR system, according to claim 9, characterized in that
said user platform data comprises:
a second geolocation data obtained from said second GPS receiver;
a second bearing data obtained from said second magnetometer;
a second inertial data obtained from said second IMU; and
a second interpolation data generated by said processor, based on said second geolocation data, said second bearing data, and said second inertial data.

12. The AR system, according to claim 9, characterized in that said plurality of weapon sensors comprises:
a trigger sensor for obtaining trigger data based on said trigger actuation of said weapon simulator; and
one or more encoders for obtaining muzzle orientation data by measuring an output angle based on an orientation of said weapon simulator on said weapon mount.

13. The AR system, according to claim 9, wherein said microcontroller is in wireless communication with said computer system; and
wherein said AR system further comprises:
first and second transceivers for said wireless transmission, said first transceiver being in electrical communication with said microcontroller and said second transceiver being in electrical communication with said computer system.

14. The AR system, according to claim 9, characterized in that said plurality of machine readable instructions comprises:
a first plurality of instructions configured to control said processor to determine a first data associated with a geolocation and a three dimensional orientation of said target platform based on said target platform data, a second data associated with a geolocation and a three dimensional orientation of said user platform based on said user platform data, and a third data associated with a muzzle orientation of said weapon simulator based on said weapon data;
a second plurality of instructions configured to control said processor to determine ballistics data based on at least: said first, second, and third data, and a path of travel of said projectile from said weapon simulator to said projectile impact;
a third plurality of instructions configured to control said processor to determine a collision assessment data based on said severity and location of said projectile impact; and
a fourth plurality of instructions configured to control said processor to generate said training simulation data, based on at least: said, first, second, and third data, said ballistics data, and said collision assessment data.

15. An AR system for field training, comprising:
a plurality of user platform sensors coupled to a user platform and configured to provide user platform data for determining geolocation, orientation, and movement of said user platform;
a weapon simulator movably mounted on said user platform via a weapon mount and comprising a plurality of weapon sensors configured to provide weapon data;
a head-worn display device for depicting AR graphic elements associated with training simulation data by projecting said AR graphic elements on a transparent medium disposed within a FOV of a user, such that said AR graphic elements are superimposed with an environment viewable by said user;

a plurality of target platform sensors coupled to a target platform and configured to provide target platform data for determining geolocation, orientation, and movement of said target platform;

a microcontroller in electrical communication with said target platform sensors and configured to packetize said target platform data for wireless transmission;

a computer system, comprising a storage medium having a plurality of machine readable instructions and a processor configured to generate said training simulation data based on said user platform data, said weapon data, and said target platform data by executing said plurality of machine readable instructions, wherein said training simulation data is transmitted to said head-worn display device and includes projectile ballistics; and first and second transceivers for said wireless transmission, said first transceiver being in electrical communication with said microcontroller and said second transceiver being in electrical communication with said computer system;

wherein said target platform is a first vehicle and wherein said plurality of target platform sensors comprises: a first GPS receiver, a first magnetometer, and a first IMU, such that said plurality of target platform sensors provides said target platform data that tracks a first location, a first orientation, and a first inertial movement of said target platform;

wherein said user platform is a second vehicle configured to transport a user of said AR system and wherein said plurality of user platform sensors comprises: a second GPS receiver, a second magnetometer, and a second IMU, such that said plurality of user platform sensors provides said user platform data that tracks a second location, a second orientation, and a second inertial movement of said user platform;

wherein said weapon simulator is a replica of a firearm configured to provide recoil and wherein said plurality of weapon sensors comprises a trigger sensor and one or more encoders, such that said plurality of weapon sensors provides said weapon data that track a trigger actuation and a muzzle orientation of said weapon simulator;

wherein at least one of said AR graphic elements of said head-worn display device provides a visual indication in said FOV of a severity and location of a projectile impact; and wherein at least another of said AR graphic elements is a simulated target configured to mimic location and movement of said target platform via said target platform data.

16. The AR system, according to claim 15, characterized in that said target platform data comprises:
a first geolocation data obtained from said first GPS receiver;
a first bearing data obtained from said first magnetometer;
a first inertial data obtained from said first IMU; and
a first interpolation data generated by said processor, based on said first geolocation data, said first bearing data, and said first inertial data.

17. The AR system, according to claim 16, characterized in that said said user platform data comprises:
a second geolocation data obtained from said second GPS receiver;
a second bearing data obtained from said second magnetometer;
a second inertial data obtained from said second IMU; and
a second interpolation data generated by said processor, based on said second geolocation data, said second bearing data, and said second inertial data.

18. The AR system, according to claim 17, further comprising an anemometer for providing environmental data associated with wind velocity and wind direction;
wherein said environmental data is used for calculating said projectile ballistics.

19. The AR system, according to claim 18, characterized in that said plurality of weapon sensors comprises:
a trigger sensor for obtaining trigger data based on said trigger actuation of said weapon simulator; and
one or more encoders operably coupled to said weapon mount for obtaining muzzle orientation data by measuring an output angle based on an orientation of said weapon simulator on said weapon mount.

20. The AR system, according to claim 19, characterized in that said plurality of machine readable instructions comprises:
a first plurality of instructions configured to control said processor to determine a first data associated with a geolocation and a three dimensional orientation of said target platform based on said target platform data, a second data associated with a geolocation and a three dimensional orientation of said user platform based on said user platform data, a third data associated with a muzzle orientation of said weapon simulator based on said weapon data, and a fourth data associated with wind velocity and wind direction based on said environmental data;
a second plurality of instructions configured to control said processor to determine ballistics data based on at least: said first, second, third, and fourth data, and a path of travel of said projectile from said weapon simulator to said projectile impact;
a third plurality of instructions configured to control said processor to determine a collision assessment data based on said severity and location of said projectile impact; and
a fourth plurality of instructions configured to control said processor to generate said training simulation data, based on at least: said, first, second, third and fourth data, said ballistics data, and said collision assessment data.

* * * * *